Patented Oct. 26, 1948

2,452,179

UNITED STATES PATENT OFFICE 2,452,179

CHEMICAL CONVERSION OF SALT CONTAINING SOLUTIONS

Albert L. Bunting, Dearborn, Mich.

No Drawing. Application July 10, 1945, Serial No. 604,307

6 Claims. (Cl. 210—24)

The present invention relates to the treatment of natural brines to remove various salts therefrom, and more particularly to the preparation and use of novel materials for treating such solutions.

The present application is a continuation in part of my co-pending application, Serial No. 437,365, now abandoned.

It is known that various solutions, such as sea water, many well waters, sugar juices, molasses, etc., often contain various salts, chiefly inorganic salts. Such salts include, among others, sodium, potassium, magnesium or calcium halides, sulfates or carbonates; or various iron or manganese compounds. As a rule, these salts are objectionable and interfere with the uses for which the solutions are intended.

It has been proposed to utilize what are known in the art as base exchange materials in order to replace the cation of said salts with a cation supplied by the exchange material. By this means the salts in solutions of the aforementioned character are converted to less objectionable ones. For instance, it is known that so-called "hard" water containing calcium or magnesium salts may be "softened" by converting such salts to the corresponding sodium compounds. Prominent among these base exchange materials are zeolites. However, the use heretofore of such base exchange materials including zeolites, has been confined to replacing only the cation of the salt in a solution, leaving the anion of the salt substantially unaffected by such materials. Such processes have for their end, the substitution of one salt for another rather than the substantially complete removal thereof from the solution. Also, each of these base exchange materials is adapted to replace but one or a few specific cations and thus is limited to one or few specific uses. For example, glauconite — a naturally occurring zeolite—is particularly adapted to convert calcium or magnesium salts to sodium salts, and thus its chief use is to "soften" water.

It is, therefore, one object of the present invention to provide a base exchange material which is adapted to remove salts from a solution by replacing the cations of said salts and, at the same time, removing the anions thereof, thereby permitting the complete removal of the salts from such solutions.

It is also an object of the invention to provide a novel base exchange material and methods for preparing and using it, whereby salt-containing solutions may be rendered substantially salt free. The present invention permits the removal of a large variety of salts from the same solution and accordingly is not confined to the limitations in use required by former practices.

A more specific object of the invention is to provide novel zeolitic materials containing an exchangeable cation adapted to form an insoluble reaction product with a particular anion or anions of salts in salt-containing solutions, said materials also being adapted to combine with or take up the cations of said salts; and to provide methods for preparing and using said zeolitic materials for removing salts from solutions.

A still more specific object of the invention is to provide a novel material of the aforesaid general character, and to provide methods for preparing it for use by means of which sea water is converted into a potable drinkable liquid which does not contain sufficient concentrations of salts to cause deleterious physiological effects.

Lastly, it is an object of the invention to provide methods of the aforesaid general character which are effective but simple to put in practice and which may be carried out in simple apparatus of various types, especially portable apparatus. Thus, the present invention when utilized in apparatus to render sea water potable is particularly adapted for use in life jackets, on lifeboats, life rafts, aeroplanes, etc. and may be in the form of a barrel, cask, or small individual containers.

The present invention is based upon my discovery that a salt may be removed from a solution by means of a base exchange material adapted to supply a metal capable of forming an insoluble reaction product with the anion of the salt. Said base exchange material is also adapted to take up or combine with the cation of said salt, which cation replaces the metal supplied by the exchange material. While the foregoing remarks have particular reference to situations in which the solution contains but one salt, it will be understood that such a solution was chosen only for purposes of simplifying the present explanation. A given base exchange material may be utilized to remove more than one salt from the solution provided, of course, that said material is adapted to supply to the solution a metal ion or ions suited to react with the anions of each of the salts desired to be removed, and provided further that the base exchange material will take up or combine with the cations of such salts.

In view of the foregoing, it will be understood that the nature of the salt in a particular solution will determine the nature of the particular base exchange material suitable for use with that solution. For example, if it is desired to remove sodium chloride, the base exchange material must be specially prepared or selected to take up or combine with the sodium cation and to supply to the solution a metal to form an insoluble chloride. Accordingly, it comprises a part of the present invention to prepare or select a suitable base exchange material for use with various salt-containing solutions contemplated for treatment.

*Preparation of a typical special zeolitic material suited for use with the present invention.*

The combined zeolites of silver and barium may be used for carrying out my invention. As pointed out hereinbefore, this material is particularly useful in removing soluble halides and sulphates from salt-containing solutions. This material may be prepared as follows:

I employ as a starting material conventional, synthetic or naturally occurring zeolites which comprise sodium zeolite, calcium zeolite, or mixtures thereof. I prefer to use a synthetic zeolite inasmuch as such zeolites possess a high exchange capacity per unit. However, the use of such zeolites is not indispensable. In particular, I recommend the synthetic zeolite such as prepared by the Research Products Corporation of Madison, Wisconsin and which I have found particularly suitable. While most any conventional available zeolite may be used as a starting material, I do not recommend the use of zeolites containing carbonates.

I treat a batch of the aforesaid starting material with a strong aqueous solution of silver nitrate and treat another batch of the said starting material with a strong aqueous solution of barium nitrate. The starting zeolites and the nitrate solutions remain in contact with each other until the reaction forming the silver zeolite in the one batch and the barium zeolite in the other batch is complete. As a rule this will take place in about ten minutes to one hour. I carry out the aforesaid reaction in a suitable container which is not adapted to be attacked by the zeolite or the solution of nitrates. While numerous such containers will occur to a skilled chemist, I have found that a plastic container or a glass lined metal container are satisfactory.

As a result of the present reaction I have found that substantially all of the exchangeable sodium, calcium, magnesium or other exchangeable metals of the starting zeolite are replaced by silver or barium, as the case may be, to form almost theoretical quantitative amounts of the corresponding zeolite.

It is desirable to use relatively concentrated solutions but not necessarily saturated solutions of silver nitrate and barium nitrate in order that the solution will wet all of the zeolite effectively. Extremely concentrated solutions of such nitrates tend to be somewhat viscous in character and sufficient water is not present to thoroughly wet all of the zeolite and, therefore, to effect the reaction in the most desirable manner. It will be understood, however, that any desired amount of the nitrates or concentrations thereof may be employed provided that sufficient silver or barium is present to substantially completely react with the quantity of starting zeolite employed.

After the starting zeolite and the nitrate solutions have remained in contact from ten minutes to one hour, as explained above, and the reaction is complete, the liquid material is removed from the silver or barium zeolites. This liquid contains the excess of the nitrate solution which did not react with the zeolite and also contains the liquid products of the reaction. This liquid is removed in any suitable way although I have found that mere drainage of the zeolite does not usually provide effective removal. Accordingly, in the laboratory I have utilized a Buechner funnel which means that the liquid was drawn off from the zeolite by suction. Commercially, suction may also be employed by the use of any suitable vacuum apparatus, although I have found that a centrifuge is satisfactory.

The silver and barium zeolites are then thoroughly washed to remove any formed nitrates and the excess of the silver and barium nitrate solutions which may still remain in contact with it. In order to insure that a maximum amount of silver or barium will remain in the zeolite during these washing operations, I employ, at least during the first washes, a more dilute solution of silver nitrate to wash the silver zeolite and a more dilute solution of barium nitrate to wash the barium zeolite. The wash water is removed from the silver zeolite in the manner above explained, that is, by the use of a Buechner funnel, or suction, or a centrifuging operation. A second washing operation is then effected in the same way as the washing operation above explained. A concluding wash or washes is utilized employing distilled water alone. These washing operations are continued until the effluent is free from the nitrate radical or from Ag ion or Ba ion, or is at least substantially free therefrom. That the wash water is free of nitrate can be determined by the usual test for the nitrate radical, that is, by the use of diphenylamine or by the brown ring test, each of which is standard and well known to chemists skilled in the art.

The number of the washes will depend upon particular circumstances, especially the character and nature of the original zeolite utilized to form the silver or barium zeolites. The grain size is particularly important in determining the number of washes needed. One skilled in the art can readily determine how many washes are needed, particularly with the aid of the tests above explained.

In using water for carrying out the present operations, either in the washing steps or in the formation of the aqueous solutions of silver or barium nitrate, it is recommended that distilled water be employed. Waters containing various impurities such as chlorine, magnesium or calcium compounds, etc. will form reaction products with silver or barium or with the zeolites thereof.

The reaction may be carried out at normal room temperatures and at normal atmospheric pressure. I have found that somewhat higher temperatures tend to speed up the reaction and therefore such higher temperatures might seem desirable. However, I do not recommend such elevated temperatures because they tend to break down the silver and barium compounds. If utilized with due caution however, the temperature may be increased somewhat if desired, although this procedure does not appear to sufficiently facilitate the reaction to make it particularly desirable. Agitation or stirring of the starting zeolite and the treating solution of the metal salt while they are in contact facilitates somewhat the reaction forming the silver and barium zeolites but is not indispensable.

One precaution however should be observed in making silver zeolite according to the foregoing method. The reaction to form the silver zeolite and, of course the subsequent washing and other subsequent steps, should be carried out in the presence of non-actinic light inasmuch as silver zeolite is photosensitive. While, of course, the ideal conditions would be total darkness, I have found as a practical matter that the reaction may be carried out in the presence of subdued light having long wave lengths without deleterious effects, and may be carried out in the presence of any light wave length above approximately 6000 Å (angstroms).

After the silver and barium zeolites have been formed and washed as above described, they are dried preferably at about 105° C. However, they can be air dried at room temperatures. For this purpose I employ conditioned air, preferably having between 20 to 40 per cent relative humidity. The zeolites are dried until they pour freely and are then ready for use in carrying out the present invention. In this connection it should be noted that practically all of the free water is removed from the zeolites but not necessarily all of the water is thus removed. This is the case because all zeolites form water of crystallization or water of hydration and silver and barium zeolites are no exception. Accordingly, the material prepared according to the present method will contain some water of crystallization or water of hydration and, of course, this water is not removed by the drying operation. However, the material produced will appear to be dry inasmuch as it has a crystalline structure or at least resembles a crystalline structure. In fact, in its physical appearance it resembles white sea sand.

The composition of matter produced by the foregoing method for producing zeolites thus comprises a zeolite in which the replaceable alkali or alkali earth metal of the starting material has been exchanged either for silver or barium. Thus, the weight of the zeolite will be increased. It is my belief that I have produced a compound which is a substantially complete zeolite or silver or barium, and in which each of the replaceable metallic ions of the original zeolite have been replaced by either a silver ion or a barium ion. Of course the reaction may be stopped prior to substantially complete conversion of the starting zeolite to silver or barium zeolite or otherwise controlled to produce less than substantially 100 per cent conversion to such zeolites. For instance, the quantity of the treating salt may be less than the theoretical quantity necessary to produce substantially 100 per cent conversion to the corresponding zeolite. However, if the method is carried out as explained above, at least 80, and in most cases well over 90 per cent of the starting zeolite will have been changed to silver or barium zeolite and, accordingly, less than 10 per cent of the starting zeolite as a rule remains mixed with the silver or barium zeolite. It also should be emphasized that the silver actually chemically combines with the zeolite part of the molecule so that the silver has a valence of one and the compound is a chemical composition in which the photosensitivity of the material is preserved. In other words, I do not intend to merely deposit metallic silver on a sodium zeolite, using the sodium zeolite as a carrier, as has been proposed in certain processes heretofore.

*The use of silver and barium zeolites to render sea water drinkable*

The silver zeolite and the barium zeolite may be mixed in suitable proportions and brought in contact with the natural brine. They react with the halide and sulphate anions of such brines. The proportions of such zeolites will vary with the sulphate and halide contact of the brine to be treated. The barium zeolite is particularly adapted to remove the sulphate anion although it also is effective in removing other anions as well. The barium sulphate is precipitated as an insoluble precipitate which is readily removed by filtration. The silver zeolite is particularly adapted to remove chloride or other halide anions except fluoride, from a halide containing solution. Accordingly, the combined zeolitic materials are particularly useful in treating sea water to make a potable liquid therefrom. The silver zeolite when brought into contact with sea water supplies silver cations to the solution and the silver cations react with the chloride anions to form silver chloride which is substantially insoluble, thereby precipitating the chloride from the solution. Assuming that the halide is the salt sodium chloride, it will be seen that the zeolite having given up silver to the solution will take up or combine with the sodium cation. The silver combined with the halide anion (except a fluoride anion) and the zeolite combined with the sodium cation produce an insoluble filterable precipitate making possible the removal of all elements of the sodium halide from the natural brine. Substantially all of the sodium chloride may be removed by this means. Thus, the sea water is rendered drinkable since less than .9 per cent by weight of the original sodium chloride content will remain in the sea water after treatment with the silver zeolite. It is known that water containing as high as .9 per cent by weight of sodium chloride may be drunk without deleterious physiological effects, the sea water treated according to the present invention contains less than this amount.

While silver zeolite is primarily useful for removing the chloride from sea water, it is to be understood that it will also remove other halides present in sea water such, for example, as metallic halides including specifically potassium chloride, calcium chloride, magnesium chloride, various bromides and iodides. It should be noted, however, that silver zeolite is not adapted to remove fluorides from the solution inasmuch as silver fluoride is appreciably soluble. Furthermore, it will be understood that the removal of such other metallic halides with the exception of the fluorides, is accomplished by the same general reaction as explained above. The silver halides, with the exception of silver fluorides, are substantially insoluble. The zeolite will take up or combine with magnesium, sodium, calcium, potassium, or other metallic ions, to form insoluble and hence filterable precipitates.

It will also be appreciated that the silver and barium zeolites will remove other metallic salts from the solution and, in fact, will remove from the solution any metallic salt having an anion with which silver or barium is adapted to form an insoluble product. Among such anions are sulphate, phosphate, carbonate, ferricyanide and others which will occur to a skilled chemist.

Any suitable apparatus by means of which the sea water may be mixed with or brought into contact with the silver and barium zeolites may be utilized for carrying out the present method of rendering sea water drinkable.

The amount of silver and barium zeolites employed in these containers will, of course, vary with the size of the container and the amount of sea water which is intended to be placed therein. Theoretically, the amount of zeolite necessary to treat a given amount of sea water is approximately 100 grams of zeolite for 500 ccs. of ordinary sea water which would contain approximately 20 grams of sodium chloride. However, I have found it preferable to use a ratio of approximately 5 or 6 parts by weight of sea water to 1 part by weight of silver and barium zeolites. It will be understood that these proportions are only preferred, and greater proportions of zeolite may be used as well as lesser proportions thereof provided that there is enough zeolite present to remove the salt from the sea water to the extent desired.

It will be understood that water emulsions or suspensions containing salts may be treated by the present methods and the term "solution" as employed herein and in the appended claims forming a part hereof, is intended to cover such emulsions and suspensions in addition to true solutions.

I claim:

1. A method of treating natural brines to remove therefrom the soluble halides and sulphates which comprises bringing the said brines into contact with the base exchange zeolitic material in which the exchange metals are silver and barium in such amounts as to supply cations capable of reacting with the halide and sulphate anions in the said natural brines to produce substantially insoluble reaction products therefrom, and thereafter separating the insoluble reaction products from the remaining solution of the starting brine.

2. A method of treating natural brines to remove halide and sulphate salts of the alkali and alkali-earth metals which comprises bringing said brines into contact with a base exchange zeolitic material in which the exchange metals are silver and barium for reacting and forming the insoluble halides and sulphates of the exchange metals and thereafter separating the insoluble reaction products from the remaining solution.

3. The method of rendering sea water potable which comprises mixing the sea water with a zeolite in which silver and barium comprises substantially all of the exchange metals therein, the amount of said zeolite being sufficient to form silver halide, barium sulphate, and a zeolite containing the alkali and other metals present in the sea water, and thereby to reduce the soluble halides and sulphates in the treated solution to a concentration of less than 0.9 per cent, and separating the insoluble reaction products from the remaining sea water solution.

4. The method of removing salts from a natural brine which comprises mixing the brine with a zeolite in which silver and barium comprises substantially all of the exchange metals therein, the amount of said zeolite being sufficient to form insoluble halides and sulphates and an insoluble zeolite containing the alkali and other metals present in the brine, and separating the insoluble halides, sulfates and zeolite from the remaining brine solution.

5. A process of rendering sea water potable which comprises contacting the sea water with cation exchange material containing silver and barium as exchangeable ions, and then separating the water from the insoluble reaction products.

6. A product for rendering sea water potable which consists essentially of cation exchange material containing silver and barium as exchangeable ions.

ALBERT L. BUNTING.

REFERENCES CITED

The following references are of record in the file of this patent:

UNITED STATES PATENTS

| Number | Name | Date |
| --- | --- | --- |
| 1,978,447 | Austerweil et al. | Oct. 30, 1934 |
| 2,066,271 | Irwin | Dec. 29, 1936 |

FOREIGN PATENTS

| Number | Country | Date |
| --- | --- | --- |
| 402,953 | Great Britain | Dec. 14, 1933 |
| 805,092 | France | Aug. 17, 1936 |

Certificate of Correction

Patent No. 2,452,179 October 26, 1948

ALBERT L. BUNTING

It is hereby certified that error appears in the printed specification of the above numbered patent requiring correction as follows:

Column 5, line 42, for the words "zeolite or" read *zeolite of*;

and that the said Letters Patent should be read with this correction therein that the same may conform to the record of the case in the Patent Office.

Signed and sealed this 20th day of June, A. D. 1950.

[SEAL]

THOMAS F. MURPHY,
*Assistant Commissioner of Patents.*